United States Patent
Ang

(10) Patent No.: US 11,028,997 B2
(45) Date of Patent: *Jun. 8, 2021

(54) SEMI-CYLINDRICAL ILLUMINATOR

(71) Applicant: LUMINIT LLC, Torrance, CA (US)

(72) Inventor: Anthony Ang, Torrance, CA (US)

(73) Assignee: LUMINIT LLC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,771

(22) Filed: Jul. 1, 2020

(65) Prior Publication Data

US 2020/0332985 A1    Oct. 22, 2020

Related U.S. Application Data

(63) Continuation of application No. 16/435,893, filed on Jun. 10, 2019, now Pat. No. 10,735,578.

(60) Provisional application No. 62/684,816, filed on Jun. 14, 2018.

(51) Int. Cl.
    *F21V 13/10*    (2006.01)
    *F21V 7/00*    (2006.01)
    *F21V 7/04*    (2006.01)

(52) U.S. Cl.
    CPC ............ *F21V 13/10* (2013.01); *F21V 7/0033* (2013.01); *F21V 7/0091* (2013.01); *F21V 7/041* (2013.01)

(58) Field of Classification Search
    CPC ...... F21V 13/10; F21V 7/0033; F21V 7/0091; F21V 7/041; F21V 7/043; G01S 7/4814; G01S 7/4817; G01S 17/42; G02B 5/02; G02B 27/143

See application file for complete search history.

(56) References Cited

U.S. PATENT DOCUMENTS

| | | | |
|---|---|---|---|
| 9,640,741 B1 | 5/2017 | Lin | |
| 10,753,578 B2* | 8/2020 | Ang | G01S 7/4817 |
| 2004/0141323 A1 | 7/2004 | Aynie | |
| 2010/0046218 A1 | 2/2010 | Huang | |
| 2011/0222294 A1 | 9/2011 | Fan | |
| 2011/0228542 A1 | 9/2011 | Hsueh | |
| 2013/0342096 A1* | 12/2013 | Keller | G02B 19/0028 313/111 |
| 2015/0036321 A1 | 2/2015 | Chang | |
| 2019/0001878 A1 | 1/2019 | Schneider | |

* cited by examiner

*Primary Examiner* — Alan B Cariaso
(74) *Attorney, Agent, or Firm* — Lathrop GPM LLP; Laura A. Labeots

(57) ABSTRACT

An illumination system converting light beams into wide-angle light transmissions including i) a cylindrical member having a cone-shaped depression in a distal end; and ii) a semi-circular member having an inner radial surface adjacent to a sidewall of the cylindrical member; and angled upper and lower annular surfaces extending from the cylindrical member and meeting at an outer radial edge. A light beam entering the proximal end of the cylindrical member strikes a first edge of the cone-shaped depression and is reflected out as a first light transmission; or it strikes a second edge of the cone-shaped depression, is reflected against the upper and lower annular surfaces, and exits the cylindrical member as a second light transmission parallel to the first diffused light transmission. At least one light path passes through a diffuser on the cylindrical member.

20 Claims, 13 Drawing Sheets

SEMI-CYLINDRICAL ILLUMINATOR

CROSS-REFERENCE TO RELATED APPLICATION

This application is a continuation of pending U.S. patent application Ser. No. 16/435,893, filed Jun. 10, 2019, and claims the benefit of priority U.S. Provisional Application Ser. No. 62/684,816, filed on Jun. 14, 2018, the entireties of which are incorporated herein by reference.

FIELD OF INVENTION

This invention relates to an illuminator system and more particularly to an illumination system having a diffuser that delivers an optical transmission that is uniformly distributed across a wide angle of about 180°.

BACKGROUND OF THE INVENTION

In automotive and aerospace displays, diffusers are used in light detection and ranging (LIDAR) systems. Such systems use light to image objects on displays. In these systems, diffusers are crucial for enhancing viewing angles and enhancing the brightness and efficiency of displays used in avionic and automotive devices and in consumer electronics. There is a need for diffusers that provide a wide angle of distribution with a high transmission efficiency.

Many illumination systems include a diffuser as an optical component that evenly distributes white light in a uniform pattern of evenly distributed light with a minimum of bright spots, and is used in a variety of industrial applications. There is a need for diffusers that eliminate hot spots, color diffraction, and light scattering, to generate uniform beams of light in shaped beam patterns.

Many systems such as automotive LIDAR systems include illuminator systems that project a beam of light into a light transmission output having a beam path of 180.degree. or greater, where the light transmission output provides a uniform distribution of light in a desired shape. Vision/optical systems that require a very wide field of view, such as such as robotic, automotive, and gaming systems can require a light transmission having such a wide beam path of uniformly diffused light.

There is a need for a robust illumination system having diffuser suitable for laser applications, especially where high temperatures, laser power, and UV transmissions can have a negative impact on other surfaces. There is a need for diffusers that direct a beam of light accurately to a target, either for viewing or for data collection under such conditions.

SUMMARY OF THE INVENTION

The invention relates to an illumination system which accepts a beam of collimated light travelling in a vertical direction and puts out a horizontal uniform illumination transmission having a viewing angle of up to 180.degree. In this illumination system, a laser beam or collimated beam of light enters a cylindrical member of the apparatus. Then light beams are internally reflected from a conical structure via total internal reflection (TIR) effects. A first half of the light is reflected to exit on one side of the cylindrical member through a diffuser; a cylinder being the member's macro structure and a diffuser being its micro structure. A second half of the light continues to be reflected off second and third angled surfaces in a TIR manner, to exit through the cylindrical member at a slightly displaced location. The horizontal direction of both light paths is spread 180 degrees uniformly. The light paths can travel through a diffuser chosen to be different values of an elliptical such as 10×1, 20×1, 30×1 etc., where the first number indicates the spread in the vertical direction (in degrees), for providing the light path with a vertical direction in a varying range of degrees.

In the subject invention, a light beam enters from the bottom of the illumination system as a collimated beam. The light beam hits a 45° TIR right circular conical surface at the top end of the illumination system. The portion of the light beam that strikes the right side of the angled conical surface spreads 180.degree. in the horizontal direction, on a first path and the light beam exits the side of the cylindrical surface. A diffuser, such as a 35° diffuser, can be applied to the cylindrical surface in the vertical direction in order to spread the light beam in the vertical direction. The light beam that strikes the left side of a first conical surface and hits a second angled surface on a second path. The light beam continues and hits a third angled surface, where it spreads towards the right of the diagram 180.degree. in the horizontal direction. The light beam exits the cylindrical surface, on second path, which is lower than the light beam on first path.

The subject invention allows for a very efficient and uniform spreading of light in a 180 degree spread. The only losses of light will be from the Fresnel surface reflection losses and material transmission. The entrance and exit losses can be further minimized by a thin film coating if desired. A uniform distribution for very high angles 100 to 180 degrees, is very difficult (or impossible) to achieve without significant light loss, using flat optics, since the severe angles start to violate TIR effects in refractive optics to escape the surface. The output cylindrical macro surface can have a diffuser attached for spreading the light in the vertical direction. This can be a classical holographic diffuser or a flat top diffuser, for example, to provide uniform distribution of the light in the vertical direction.

An embodiment of the invention relates to an illuminator comprising: a) a cylinder having a depression at a distal end of the cylinder, the depression having a right circular cone shape and a first sloped surface sloping between 40-60° from the distal end, and the cylinder having at least one diffuser; b) a first flaring skirt member depending from a first portion of the cylinder, the first flaring skirt member having a second sloped surface sloping between 40-60° from the distal end of the cylinder; and c) a second flaring skirt member depending from a second portion of the cylinder, the first flaring skirt member having a third sloped surface of sloping between 40-60° from a proximal end of the cylinder; the flaring skirt members meeting to define an equatorial ridge; each flaring skirt member having first and second side surfaces meeting the first and second side surfaces of the other flaring skirt member; such that when a light beam enters the proximal end of the cylinder, i) the light beam strikes a first portion of the first sloped surface and is reflected to exit the cylinder on a first path, or ii) the light beam strikes a second portion of the first sloped surface and is reflected against the second sloped surface, then the third sloped surface, and then exits the cylindrical member on a second path parallel to the first path; and such that at least one of the first and second paths pass through the diffuser.

An aspect of the illuminator includes: the first flaring skirt member depends from a half portion of the distal end of the cylinder; and the second flaring skirt member depends from a half portion of the proximal end of the cylinder.

Another aspect of the illuminator includes the second and third sloped surfaces being sloped between 44-46°

Yet another aspect of the illuminator includes the diffuser providing a vertical angle in the range of 0-35.degree. to the path passing through it.

An additional aspect of the illuminator includes a flat-top diffuser providing a vertical angle to the path passing through it, chosen from the following: 0.5, 1, 2, 3.5, 5, 10, 15, 20, 25, 30, and 35 degrees.

Another aspect of the illuminator includes: the first path being proximate to the distal end of the cylinder; the second path being proximate to the proximal end of the cylinder; and both paths being perpendicular to a longitudinal axis of the cylinder.

Another embodiment of the invention relates to an illumination system comprising: a) a cylindrical member having: i) a sidewall comprising a diffuser; ii) a longitudinal axis; and iii) a top portion comprising a cavity having an inverted right-angled cone shape, the cavity including a first angled surface being symmetrical about the longitudinal axis; and b) a half-torus member adjacent to the cylindrical member, the half-torus member having: i) an inner radius adjacent to the cylindrical member; ii) a second angled surface extending outward and downward from the top portion of the cylindrical member; iii) a third angled surface extending outward and upward from a bottom portion of the cylindrical member; the second and third angled surfaces meeting to define an outer radius of the half-torus member; and iv) first and second end surfaces, each end surface connecting the second and third angled surfaces, and each end surface extending outward from the cylindrical member; such that a light beam entering the bottom portion of the cylindrical member hits the first angled surface and is reflected to exit through the cylindrical member; such that when the light beam strikes a first portion of the first angled surface, the light beam is reflected to exit the cylindrical member on a first path, the first path being perpendicular to the longitudinal axis; and when the light beam strikes a second portion of the first angled surface, the light beam reflects against the second angled surface, then the third angled surface, and then exits the cylindrical member on a second path parallel to the first path; and such that at least one of the first and second paths pass through the diffuser.

An aspect of the illumination system includes each of the first and second angled surfaces extend from the cylindrical member at an angle between 40-60°; and the second and third angled surfaces meet at an angle between 60-120° to define the outer radius of the half-torus member.

Another aspect of the illumination system includes each of the first and second angled surfaces extend from the cylindrical member at an angle between 44-46°; and the second and third angled surfaces meeting at a right angle to define the outer radius of the half-torus member.

An additional aspect of the illumination system includes the light beam being collimated when entering the cylindrical member.

Another aspect of the illumination system includes a flat-top diffuser providing a vertical angle in the range of 0-35° to the path passing through it.

Yet another aspect of the illumination system includes the diffuser providing a vertical angle to the path passing through it, chosen from the following: 0.5, 1, 2, 3.5, 5, 10, 15, 20, 25, 30, and 35 degrees.

An additional aspect of the illumination system including the inverted angled surface being divided into a first half section distal from the semicircular body member and a second half section proximate to the semicircular body member; such that when the light beam strikes the first half section of the inverted angled surface, the light beam is reflected to exit the cylindrical body member on a first path through the top portion of the cylinder; and when the light beam strikes the second half section of the inverted angled surface, the light beam reflects against the semicircular upper segment, then the semicircular lower segment, and then exits the cylindrical body member on a second path through the bottom portion of the cylinder, the first and second paths being perpendicular to the longitudinal axis of the cylindrical member.

Another embodiment of the invention relates to an illumination system including a) a cylindrical body member having a top portion, a bottom portion, and a longitudinal axis; the top portion having a depression in a shape of an inverted right circular cone with an inverted angled surface, the inverted angled surface being symmetrical about the longitudinal axis, and at least one of the top and bottom portions comprising a diffuser; and b) a semicircular body member adjacent to the cylindrical body member, the semicircular body member having: i) an semicircular upper segment flaring downward from the cylindrical body member; ii) a semicircular lower segment flaring upward from the cylindrical body member, the semicircular segments meeting and defining a semicircular equator; and iii) first and second side surfaces attaching to opposite sides of the cylindrical body member, the side surfaces defining a plane parallel to the longitudinal axis of the cylindrical body member; such that a light beam entering the bottom portion of the cylindrical body member hits the inverted angled surface and spreads in a 360° angle direction; and such that when the light beam strikes a first portion of the inverted angled surface, the light beam is reflected to exit the cylindrical body member on a first path; and when the light beam strikes a second portion of the inverted angled surface, the light beam reflects against the semicircular upper segment, then the semicircular lower segment, and then exits the cylindrical body member on a second path parallel to the first path; and such that at least one of the first and second paths pass through the diffuser.

An aspect of the illumination system includes the semicircular segments flaring at a 45.degree. angle from the cylindrical body member; and the semicircular segments meeting at a right angle at the semicircular equator.

Another aspect of the illumination system such that when the light beam strikes one half of the inverted angled surface, the light beam is reflected to exit the cylindrical body member on a first path; and when the light beam strikes the other half of the inverted angled surface, the light beam reflects against the semicircular upper segment, then the semicircular lower segment, and then exits the cylindrical body member on a second path parallel to the first path.

An additional aspect of the illumination system is that the second half of the inverted angled surface faces the semicircular body member.

Another aspect of the illumination system includes the semicircular segments flaring at an angle between 44-46°.

Yet another aspect of the illumination system includes the diffuser providing an outer surface of the cylindrical body.

Still another aspect of the illumination system includes the diffuser providing a vertical angle in the range of 0-35° to the path passing through it.

BRIEF DESCRIPTION OF THE DRAWINGS

The accompanying drawings illustrate the present invention and together with the description, further serve to explain the principles of the invention and to enable a person skilled in the relevant art to make and use the invention.

These and other features and advantages of the present invention will be apparent from the following detailed description, claims, and accompanying drawings.

Figure 1:
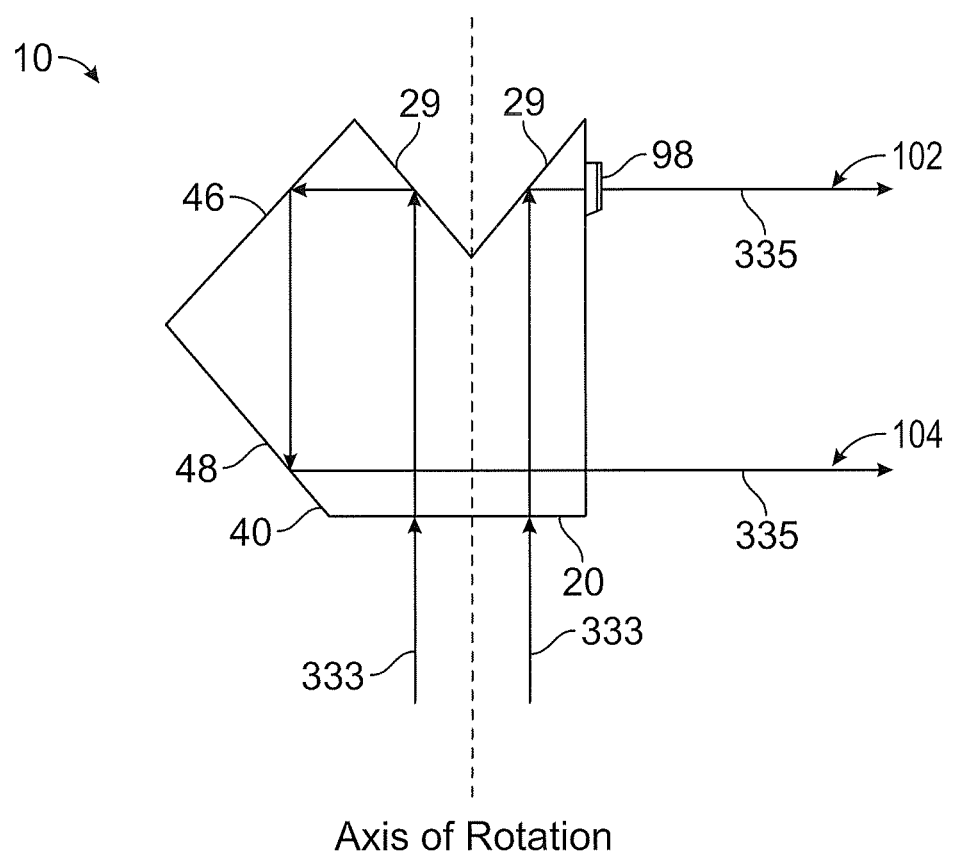
FIG. 1 is a schematic of the illumination system, showing the cylindrical member adjacent to the semicircular member, with the illumination system providing a structure through which light is diffused and reflected. Individual beams of light can enter through a first end of the illumination system, then be reflected off the surface of a cone-shaped depression. Depending on which portion of the depression the light beam strikes, the light beam can be reflected once to exit via near the second end of the illumination system, or the light beam can be reflected off multiple surfaces of the illumination system, to exit near the first end of the illumination system. Regardless of which pathway the light beam follows, the exiting paths of the light beams are preferably parallel to each other.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF EMBODIMENTS OF THE INVENTION

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiment.

The features of the invention disclosed herein in the description, drawings, and claims can be significant, both individually and in any desired combinations, for the operation of the invention in its various embodiments. Features from one embodiment can be used in other embodiments of the invention.

Referring to the Figures, FIGS. 1-19 show embodiments of an illumination system.

Embodiment 1

As shown in FIGS. 1 and 4-10, the illumination system 10 comprises a cylindrical member 20 and a semicircular member 40 adjacent to each other.

Figure 2A:
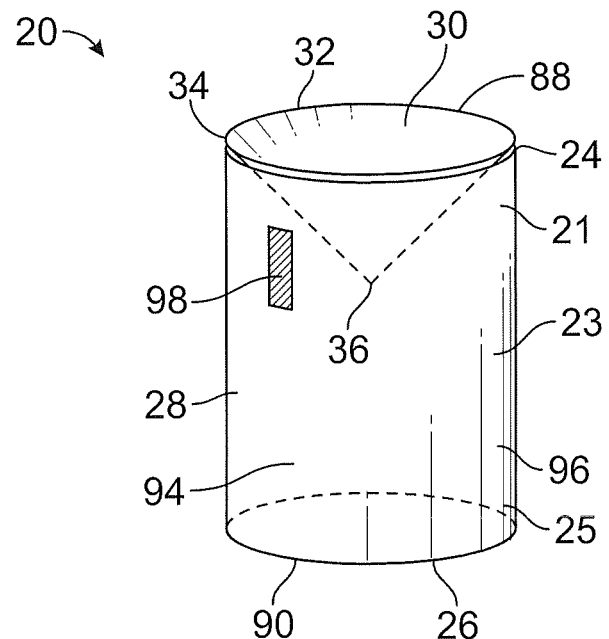
FIGS. 2A-2B shows perspective views of embodiments of a cylindrical member of the illumination system.
Figure 2B:
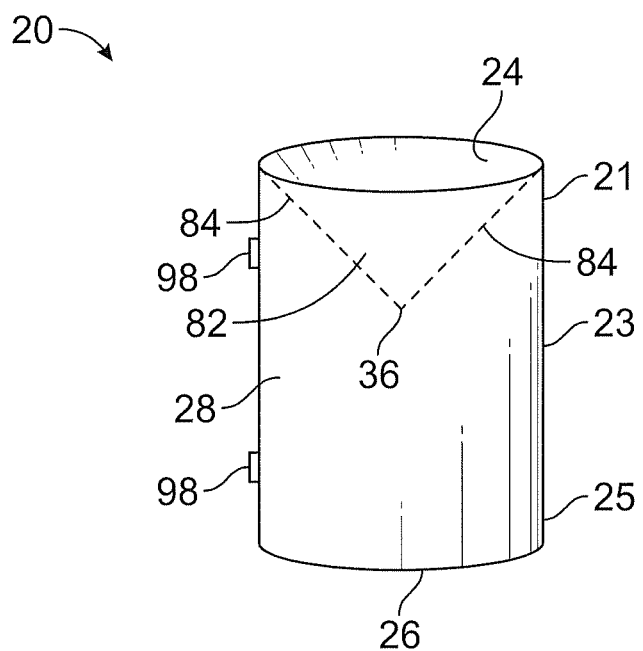

The cylindrical member 20 can have an elongated body that is generally tubular or rod-shaped, such as shown in FIGS. 2A-2B. The cylindrical member 20 has a top portion 21, bottom portion 25, and a central portion 23 therebetween. The cylindrical member 20 has a top surface 24 opposed to a bottom surface 26 with a sidewall 28 extending between the top and bottom ends 24, 26. The cylindrical member 20 is preferably symmetrical about a longitudinal axis; preferably, the top and bottom surfaces 24, 26 are perpendicular to the longitudinal axis. In a cross-section formed by a plane perpendicular to the longitudinal axis, the cylindrical member 20 can define a round or oblong shape or outline, though a circular shape is preferred.

The top surface 24 of the cylindrical member 20 includes a depression 30 or cavity in a central portion of the top surface 24. The depression 30 has the shape of an inverted cone, so that the top edge of the depression 30 is contiguous with the top surface 24 of the cylindrical member 20. The top edge can possess a round perimeter 32; preferably the perimeter 32 of the depression 30 is contiguous with the outer perimeter 34 of the top surface 24. The perimeter of the depression 30 can also be the perimeter of the top surface 24. The surface 29 of the depression can extend inward from its perimeter 32, defining an angle, preferably between 10-80°, 30-60°, 40-50°, or most preferably at approximately 45° with respect to the top surface 24 (or with respect to a plane defined by the top edge 24).

The depression 30 or cavity has an inverted cone shape (and so too the depression surface 29), so that the tip 36 of the depression 30, extends into an interior portion of the cylindrical member. Preferably, the cone-shaped depression 30 has the shape of a right-angle cone with the tips defining an angle that is approximately 90°; that is, a cone that has its apex aligned directly above the center of the cone's base. Here, the apex can intersect a central longitudinal axis of the cylindrical member 20. The central longitudinal axis of the cone-shaped depression 30 can share the same longitudinal axis of the cylindrical member 20. Preferably, the cone-shaped depression 30 is symmetrical about its longitudinal axis and about the longitudinal axis of the cylindrical member 20.

Figure 3:
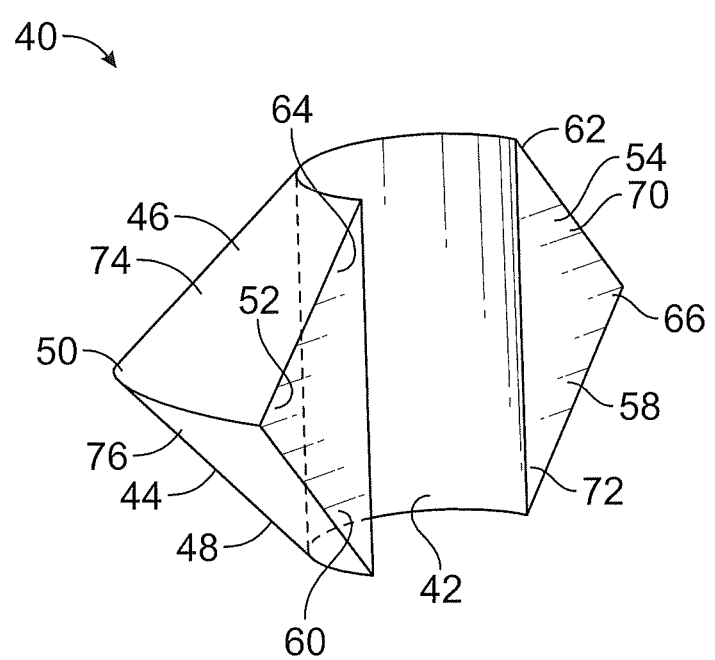
FIG. 3 shows a perspective view of an embodiment of a semicircular or semi-annular member of the illumination system.
Figure 4A:
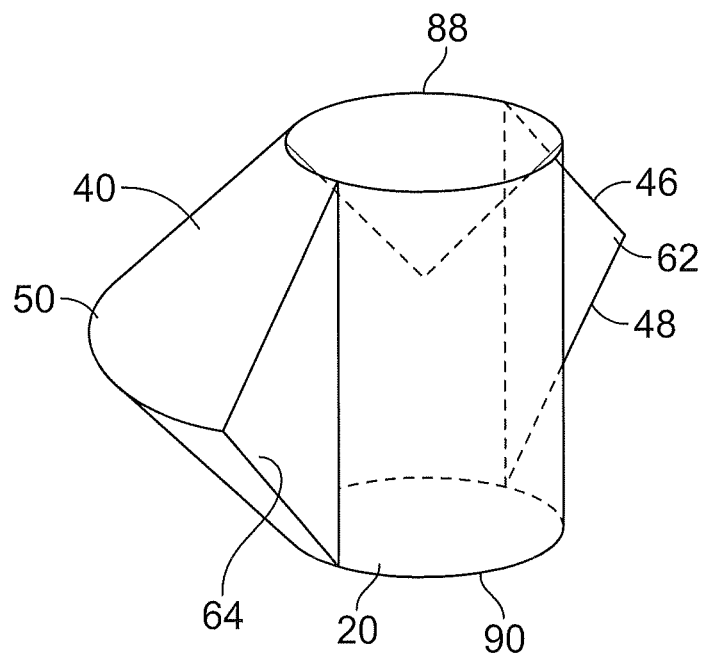
FIG. 4A shows a representation of an embodiment of the illumination system, including a cylindrical member adjacent to a semicircular member.
Figure 4B:
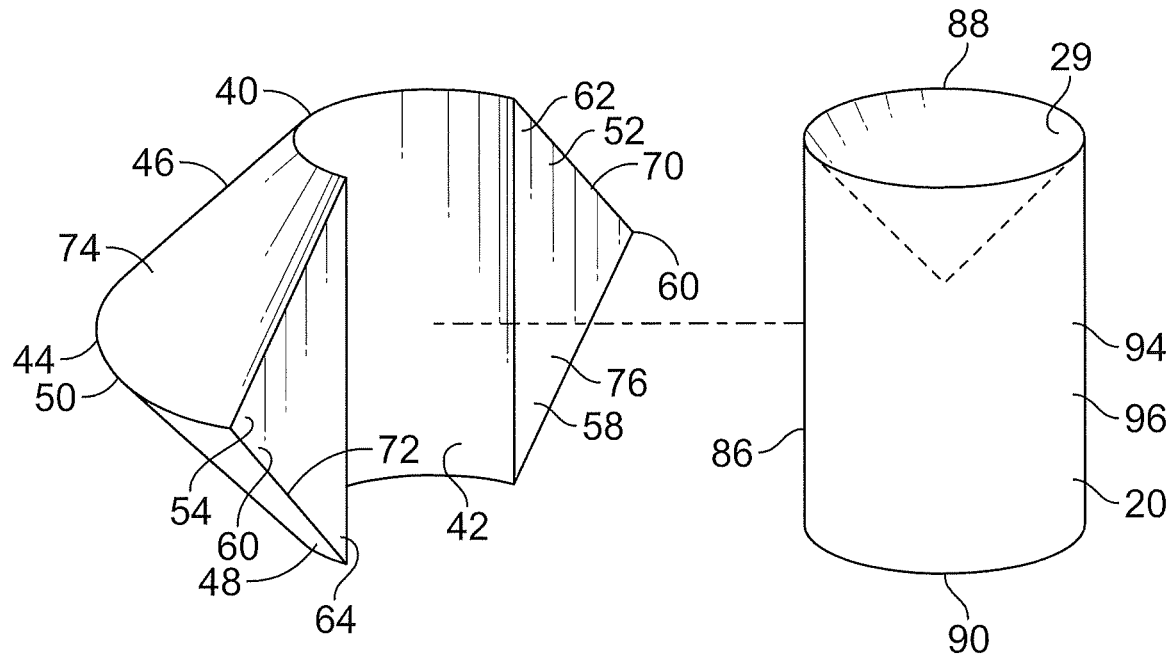
FIG. 4B shows an exploded view of FIG. 4A.
Figure 5:
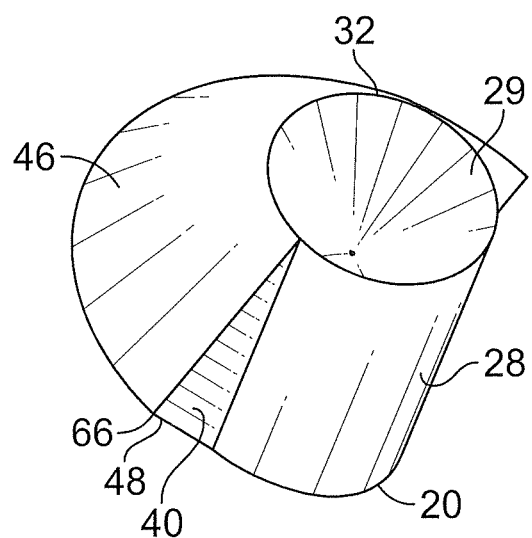
FIG. 5 shows a top perspective view of an illumination system.

The illumination system 10 includes an additional structure adjacent to the first cylindrical member 30; it includes a second member 40 having a shape similar to a semicircle, or a portion of a torus. Where a torus has a three-dimensional annular or ring shape, the semicircular member 40 generally has a C-shape or a shape similar to that of one-half of a torus (as defined by a plane running along a longitudinal axis of the torus), such as shown in FIGS. 3 and 4A-4B. The semicircular member 40 has an inner radial surface 42 and an outer radial surface 44 parallel to and encircling the inner radial surface 42. In the illumination system 10, the inner radial surface 42 is adjacent to or in communication with the sidewall 28 of the cylindrical member 20.

The semicircular member 40 includes an upper angled surface 46 and a lower angled surface 48 that meet each other. The upper angled surface 46 angles outward and downward from the top portion 21 of the cylindrical member 20. The lower angled surface 48 angles outward and upward from the bottom portion 25 of the cylindrical member 20. The upper and lower angled surfaces 46, 48 meet each other, defining an angle preferably between 45-135°, 60-120°, 80-100°, or most preferably at approximately 90° The angled surfaces 46, 48 can have flat surfaces, curved surfaces, or irregular surfaces.

Preferably, the cylindrical and semicircular members 20, 40 have heights that are similar or the same. The upper and lower angled or sloped surfaces 46, 48 can meet to define a point or ridge 50. The ridge 50 can define, or run along, the outer radius or outer radial surface 44 of the semicircular member 40. The ridge 50 can lie in a plane perpendicular to a longitudinal axis of the cylindrical member 20. The ridge 50 can define an equatorial line encircling a central portion or the midline of the semicircular member 40. The ridge 50 can define an equatorial line encircling a central portion or the midline of the cylindrical member 20.

The semicircular member 40 can be adjacent to a portion of the sidewall 28; preferably, the semicircular member 40 communicates with one longitudinal portion of the sidewall 28, extending between and communicating with the top portion 21 through the bottom portion 25 of the cylindrical member 20. Preferably, the semicircular member 40 communicates with approximately one half of the outer surface of the sidewall 28.

If the semicircular member 40 completely encircled the outer surface of the cylindrical member 20, its exterior surface would include only the angled upper and lower surfaces 46, 48 and the ridge 50 where the angled upper and lower or sloped surfaces 46, 48 join each other. In embodiments of the present invention, such as shown in FIGS. 4A-4B, 5, and 7, the semicircular member 40 encircles a corresponding portion of the cylindrical member 20. If the semicircular member 40 defines a half-torus or a half-circular curve, then the semicircular member 40 communicates with one-half of the sidewall 28. That is, the inner radial surface 42 is adjacent to or in communication with the one-half of the outer surface of the sidewall 28 of the cylindrical member 20. If the semicircular member 40 defines a quarter-torus or a quarter-circular curve, then the semicircular member 40 communicates with one-quarter of the sidewall 28, and so on.

Where the semicircular member 40 encircles less than all of the cylindrical member 20, the upper angled surface 46 extends from the top portion 21 of the cylinder and ends at the ridge 50. The upper angled surface 46 includes first and second end surfaces 52, 54 extending between and connecting the sidewall 28 and the ridge 50. Similarly, the lower angled surface 48 extends from the bottom portion 25 of the cylinder and ends at the ridge 50. The lower angled surface 48 includes first and second end surfaces 58, 60 extending between and joining the sidewall 28 and the ridge 50. The first ends surfaces 52, 58 can form a continuous or contiguous first side surface 62 for the semicircular member 40. The second ends surfaces 54, 60 can form a continuous or contiguous second side surface 64 for the semicircular member 40. The first and second side surfaces 62, 64 can define surfaces that are parallel to each other. The first and second side surfaces 62, 64 can define a common plane that is preferably parallel to the longitudinal axis of the cylindrical member 20. The first and second side surfaces 62, 64 preferably define a longitudinal line along the sidewall 28 and extend outward from the sidewall 28 at a right angle.

As shown in FIGS. 4-7, the first and second side surfaces 62, 64 can have a triangular shape. Where the upper and lower angled surfaces 46, 48 meet at a 90°. angle, the first and second side surfaces 62, 64 can define right triangles. The first and second side surfaces 62, 64 can have a triangular tip 66 that contacts the ridge 50.

As shown in FIGS. 3-4, the angled upper surface 46 can be said to define the upper surface of a semicircular upper segment 70 flaring outward and downward from the top portion 21 of the cylindrical body member 40. The angled lower surface 48 can be said to define the lower surface of a semicircular lower segment 72 flaring outward and upward from the bottom portion 25 of the cylindrical body member 40. As the angled upper and lower angled surfaces 46, 48 meet to define an equatorial ridge 50, the semicircular upper and lower segments 70, 72 can meet to define an equatorial plane that extends to intersect the longitudinal axis of the cylindrical body member 20, preferably through the central portion 23 of the cylindrical body member 20. That equatorial plane is preferably oriented to be perpendicular to the longitudinal axis of the cylindrical body member 20.

The semicircular upper and lower segments 70, 72 can define upper and lower flaring skirt members 74, 76 depending from portions of the cylindrical member 20 to define the semicircular member 20. The semicircular member 40 can include an flaring skirt member 74 and a lower flaring skirt member 76 that meet each other at an angled or pointed ridge 50. The upper flaring skirt member 74 slopes or flares outward and downward from the top surface 24 (or the distal end) of the cylindrical member 20. The lower flaring skirt member 76 slopes or flares outward and upward from the bottom surface 26 (or the proximal end) of the cylindrical member 20. The upper and lower flaring skirt members 74, 76 can define an angle preferably between 45-145°, 60-120°, 80-100°, or most preferably at approximately 90° between them and the adjoining portion of the cylindrical member 20.

The upper and lower flaring skirt member 74, 76 meet each other, defining an angle preferably between 45-145°, 60-120°, 80-100°, or most preferably at approximately 90°.

Each flaring skirt member 74, 76 can include an interior surface that joins the interior surface of the other flaring skirt member 74, 76. Each flaring skirt member 74, 76 can include first and second side surfaces 62, 64 that extend between the cylindrical member 20 and the ridge 50. Preferably, the first and second sides surfaces 62, 64 of one flaring skirt member (e.g. 74) are continuous or contiguous with the first and second sides surfaces 62, 64 24 of the other flaring skirt member (e.g. 76).

The illumination system 10 can comprise components that are solid or define a structure with a hollow interior.

Figure 9:
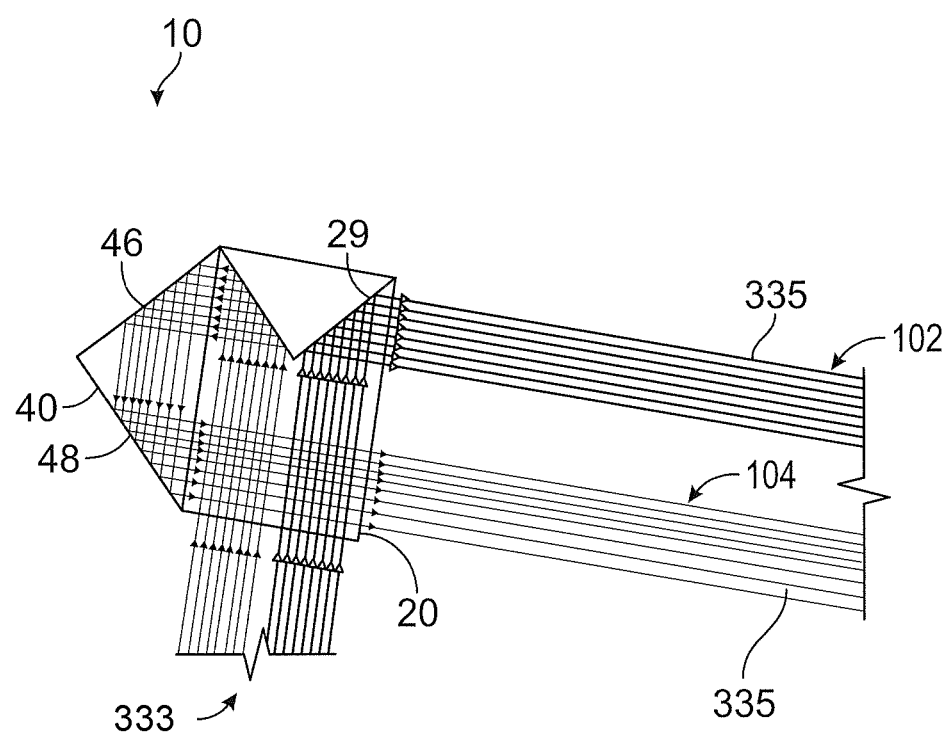
FIG. 9 shows a schematic of multiple beams of light entering a proximal end of the illumination system, traversing the cylindrical member to strike the surface of the inverted cone-shaped top surface of the cylindrical member. Light beams striking the side of the inverted cone distal from the semicircular member are reflected to exit the illumination system through the cylindrical member on pathways near the distal end of the cylindrical member. Light beams striking the side of the inverted cone proximal to the semicircular member are reflected to strike the upper and lower surfaces of the semicircular member, and then to exit the illumination system through the cylindrical member on pathways near the proximal end of the cylindrical member.
Figure 10:
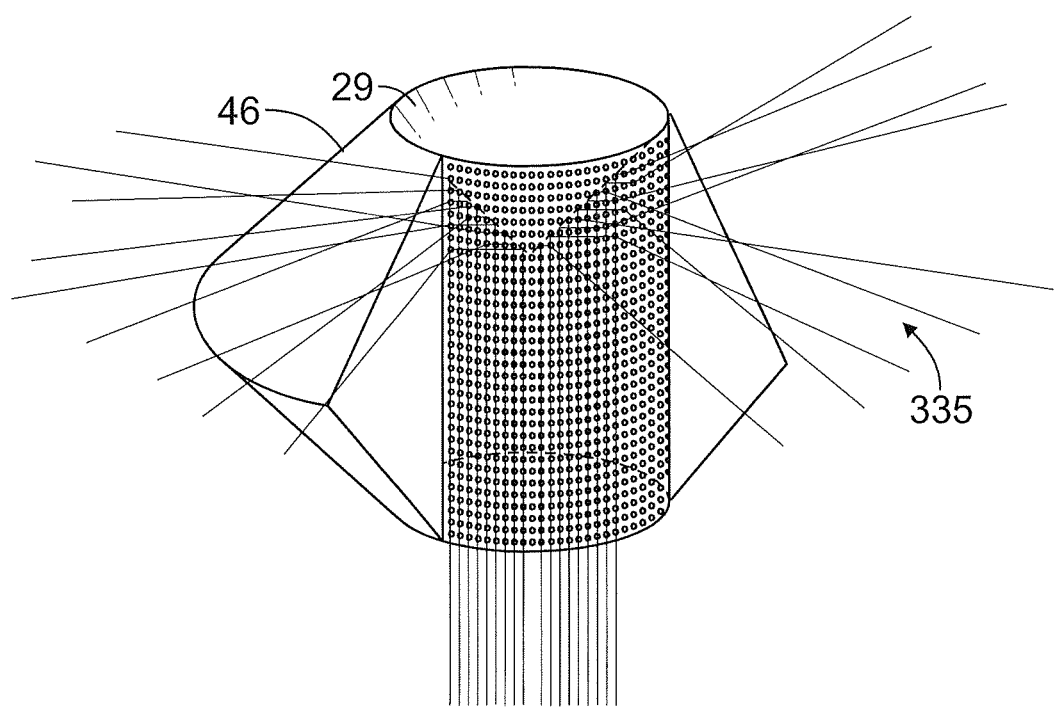
FIG. 10 shows an alternate view of FIG. 9.
Figure 11:
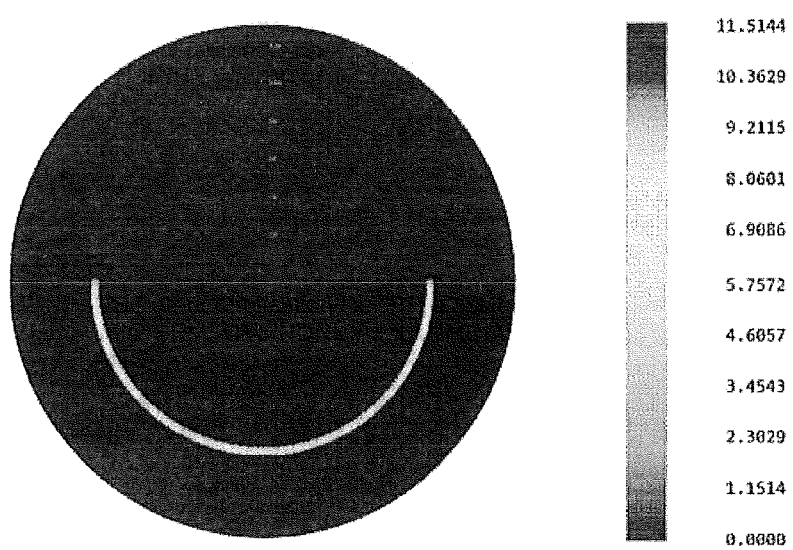
FIG. 11 shows a top view of the illumination system and illustrates the distribution of light beams exiting the illumination system. The light beams have a 180 degree distribution in the horizontal direction.
Figure 12:
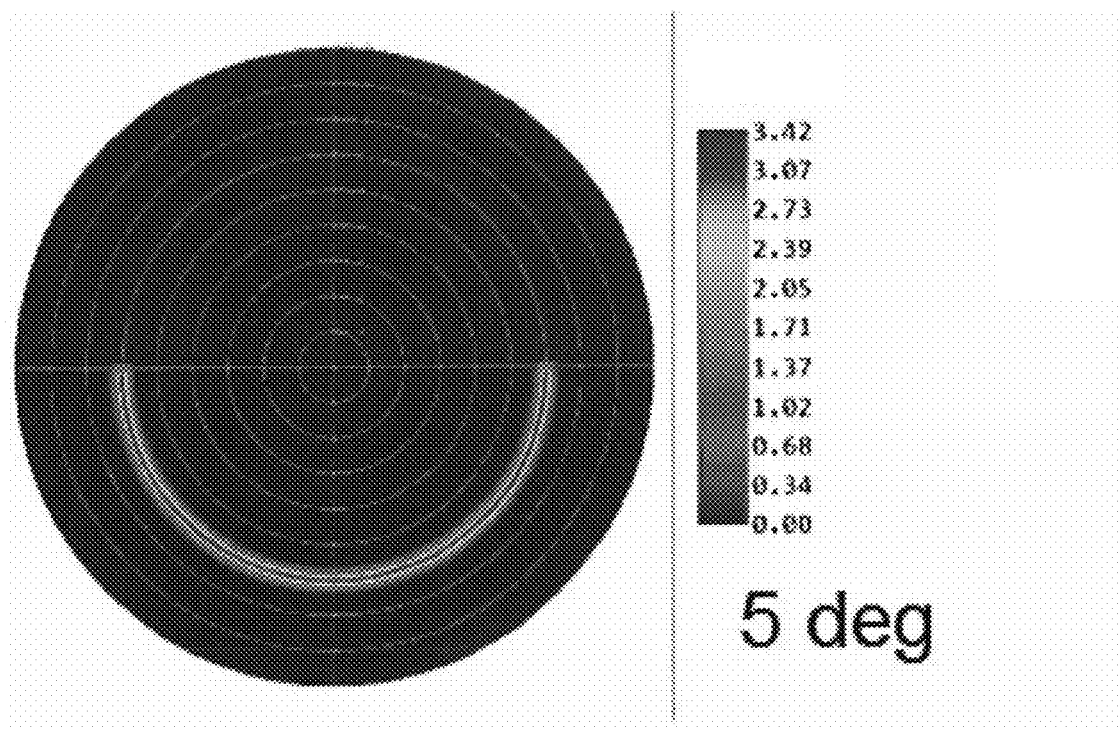
FIG. 12 shows a top view of the illumination system and illustrates the distribution of light beams exiting the illumination system. The light beams have a 180 degree distribution in the horizontal direction and a 5 degree distribution in the vertical direction.
Figure 13:
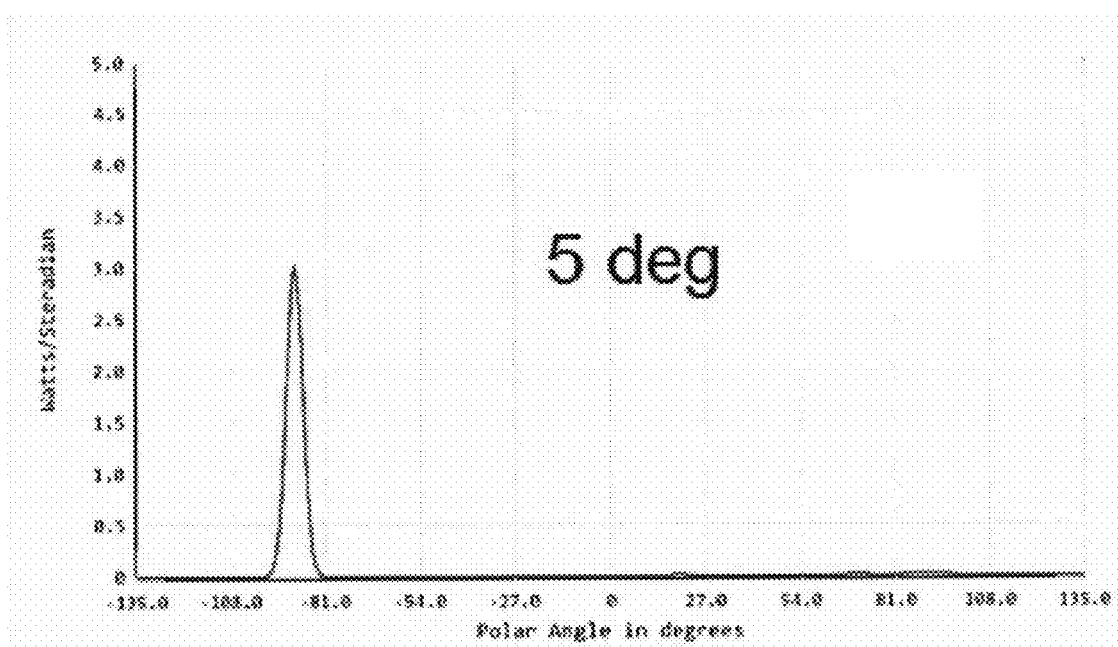
FIG. 13 shows the measurement strength of the signal obtained by the diffused light shown in FIG. 12.
Figure 14:
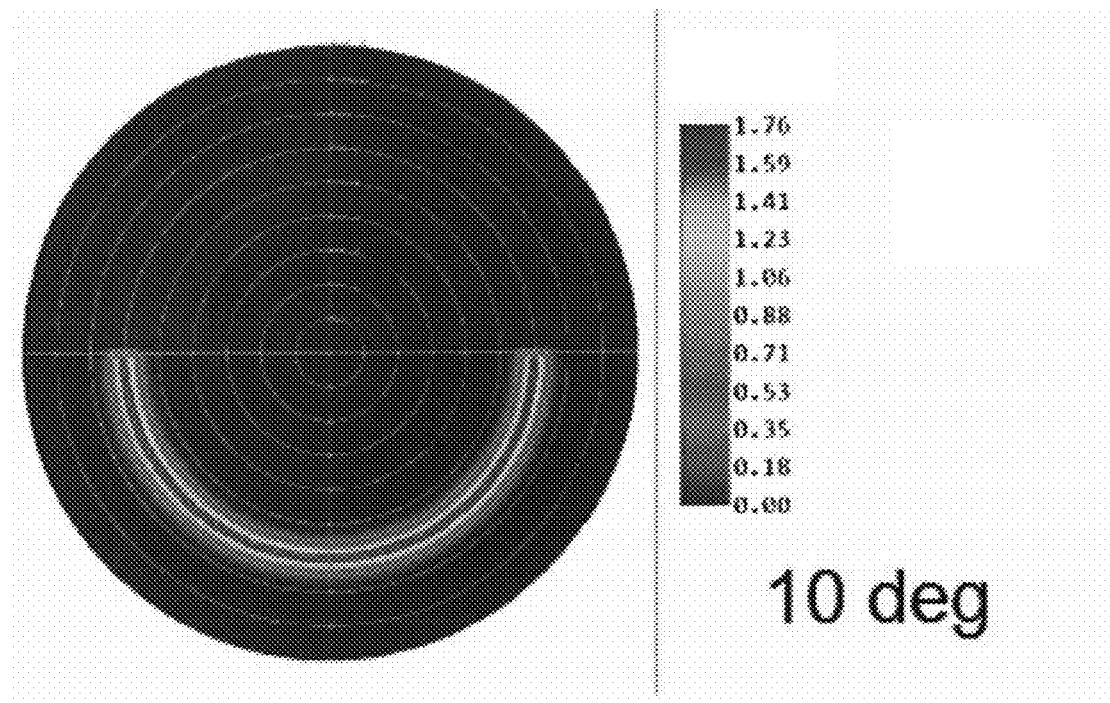
FIG. 14 shows a top view of the illumination system and illustrates the distribution of light beams exiting the illumination system. The light beams have a 180 degree distribution in the horizontal direction and a 10 degree distribution in the vertical direction.
Figure 15:
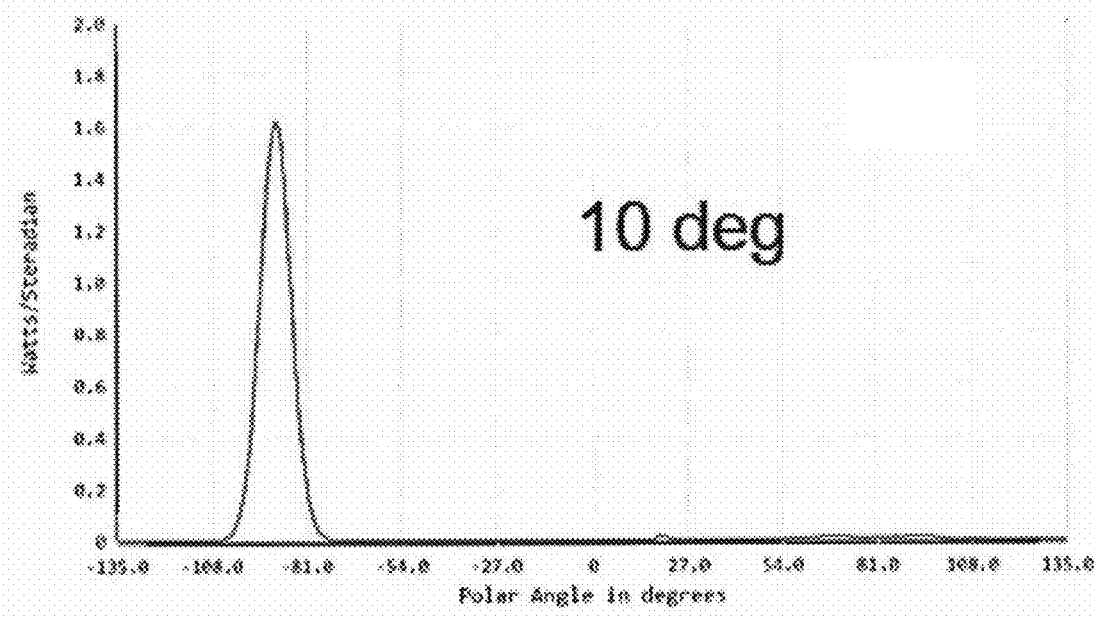
FIG. 15 shows the measurement strength of the signal obtained by the diffused light shown in FIG. 14.
Figure 16:
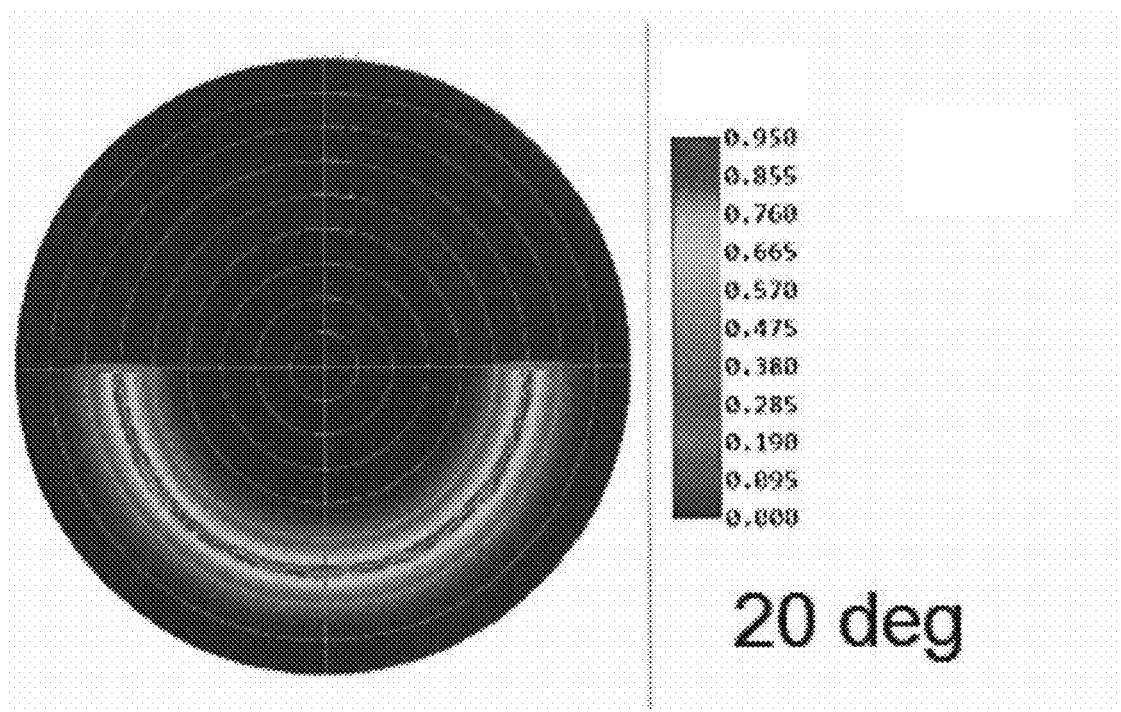
FIG. 16 shows a top view of the illumination system and illustrates the distribution of light beams exiting the illumination system. The light beams have a 180 degree distribution in the horizontal direction and a 20 degree distribution in the vertical direction.
Figure 17:
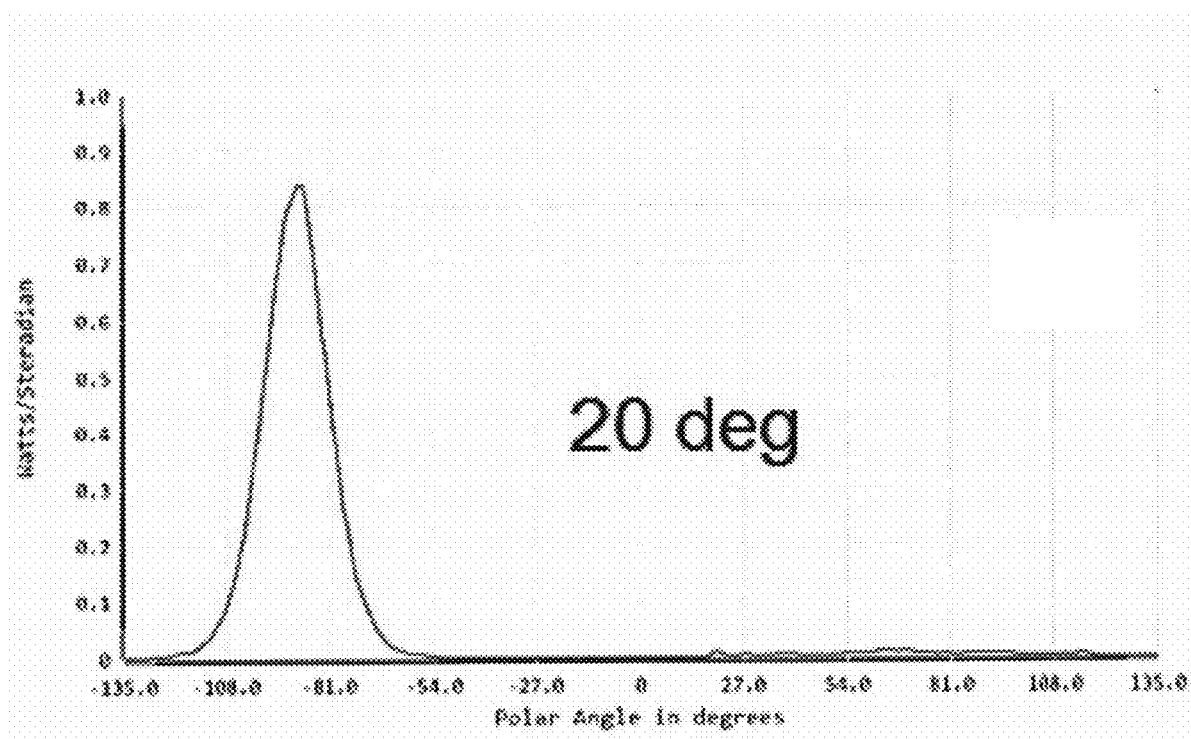
FIG. 17 shows the measurement strength of the signal obtained by the diffused light shown in FIG. 16.
Figure 18:
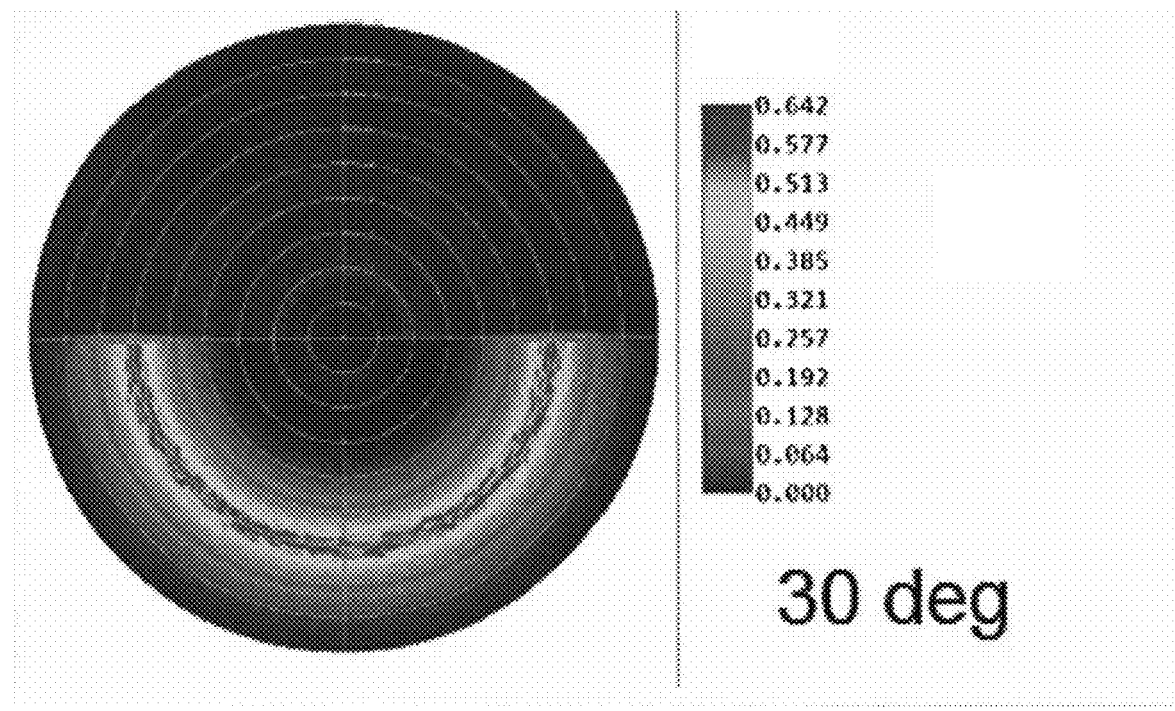
FIG. 18 shows a top view of the illumination system and illustrates the distribution of light beams exiting the illumination system. The light beams have a 180 degree distribution in the horizontal direction and a 30 degree distribution in the vertical direction.
Figure 19:
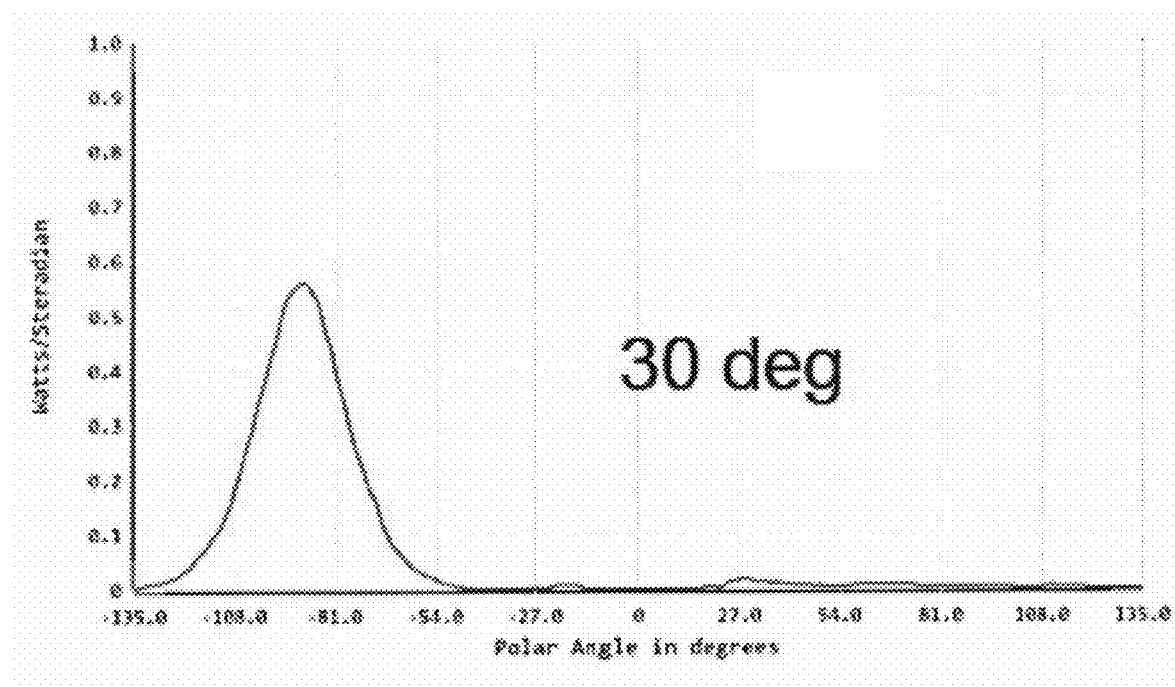
FIG. 19 shows the measurement strength of the signal obtained by the diffused light shown in FIG. 18.

Briefly, as shown in FIGS. 1 and 9-10, when a light beam 333 enters the bottom portion 25 of the cylindrical member 20, it can strike the angled surface 29 of the depression 30 and be reflected, directly or indirectly, to exit the sidewall 28 of the cylindrical member 20. When a light beam 333 enters the proximal end 26 of the cylindrical member 20, i) the light beam 333 strikes a first portion of the first sloped or angled depression surface 29 and is reflected to exit the cylindrical member 20 on a first path, or ii) the light beam 333 strikes a second portion of first sloped or angled depression surface 29 and is reflected against the second upper sloped surface 46, then the third lower sloped surface 48, and then exits the cylindrical member 20 on a second path parallel to the first path.

Embodiment 2

In some embodiments, such as shown in FIG. 2B the subject invention includes an illuminator 10 having a cylinder 20, with an inverted right circular cone 82 with sides 84 of approximately 45.degree. at a distal end 88 of the cylinder 20 and an outwardly pointing cone 40 attached to a side 86. The cylinder 20 is symmetrical about an axis and the inverted right circular cone 82 is symmetrical about the axis. A second angled surface 46 is on one side 86 of the cylinder 20 and a third angled surface 48 is on the same side 86 of the cylinder 20, each with a slope of approximately 45°, wherein a light beam 333 entering the cylinder 20 at a proximal end 90 of the cylinder 20 hits the inverted right circular cone 82 and exits the outer cylindrical sidewall surface 96 on a first path 102. The light beam 333 on the one side 86 of the cylinder 20 hits the second angled surface 46 and continues on to hit the third angled surface 48 to then travel through the cylinder 20 and exit the cylinder 20 on a second path parallel 104 to the first path 102.

As shown in as shown in FIGS. 1 and 9-10, the inverted right circular cone 82 extends into an interior portion 94 of the cylinder 20. The inverted cone 82 preferably has a right angle at one end and an external cone on a side. The cylindrical part 20 of the structure is symmetrical about a longitudinal axis. The outwardly pointing cone 40 can be located adjacent to or joining the outer side 86 of the cylinder 20. The base of the outwardly pointing cone 40 contacts the outer side 86 of the cylinder 20 and extends outward. The outwardly pointing cone 40 extends around a central portion 23 of the cylinder 20, with the tip or apex defining a curved path surrounding a portion of the cylinder 20. Following the apex from one end to the other, the apex can define a ridge 50 encircling a portion of the cylinder.

Using the Illumination System

As shown in as shown in FIGS. 1 and 9-10, a beam of light 333 can be from provided from a laser, LED, synchrotron, lenses and mirrors, or other source. The light or other electromagnetic radiation (e.g. x-rays) should be collimated (having rays that travel in parallel paths); that is, the light or other electromagnetic radiation should travel in parallel rays that spread minimally as it travels. The light should also have a symmetric shape, preferably a circularly symmetric shape.

The light beam 333 enters the illumination system 10 from the bottom end or bottom surface 26 of the cylindrical member 20 and travels toward the top end or surface 24 (light travels from south to north). The entry of the light beam 333 is nominally flat. If the light beam 333 is not yet collimated, the bottom surface 26 can be made into a Fresnel lens or classical lens (or other) to collimate the light beam 333 as it enters and travels upwards inside the cylindrical member 20.

After entry into the cylindrical member 20, the next surface the light beam 333 will strike is the circular cone 82 on the top end or surface 24 (north surface) of the cylindrical member 20, such as shown in FIG. 1. This circular cone 82 has a longitudinal axis (similar to global axis of rotation) of symmetry as defined in FIG. 1. In some embodiments, the light beam 333 will strike is the depression surface 29 located in the top end or surface 24 (north surface) of the cylindrical member 20, such as shown in FIGS. 1-2. The circular cone 82 is preferably a right circular conical solid component or member.

After the light beam 333 strikes one of these this conical surfaces (e.g., 82, 29), the TIR action will spread the light beam 333 in a full 360 degrees direction. The vector directions originate from the center of a sphere or globe and travel in an equatorial direction. This is shown in FIG. 1 with the top horizontal vectors (travelling left and right, or west and east, from the conical structures within the cylindrical member 20).

After striking a conical structure, the light beam 333 travels to the right or eastern direction (180 degrees of the 360 degrees, first path 102) will next strike the cylinder sidewall surface 96. The cylindrical member can comprise a material that acts as a diffuser.

A diffuser 98 on first path 102 can be applied to this cylindrical surface 96 to cause the light beam 333 to spread in a vertical direction, such as shown in FIGS. 1-2. The amount or degree of spread can be customized with either a standard light shaping diffuser or a flat top diffuser or the like. The diffuser 98 has a very low angle (such as less than 20 degrees, less than 10 degrees, less than 5 degrees, or 1 degree or less) in the horizontal direction and a custom angle in the vertical direction. The diffuse light 335 exiting the cylindrical member 20 is now travelling 180 degrees in the horizontal direction and a custom angle in the vertical direction.

A light beam 333 that is reflected to the opposite direction (to the left or 180 degrees of the 360 degrees, second path 104) will next strike another conical structure provided by the semicircular member 40. As the light beam strikes the semicircular member 40, it is reflected against first the upper angled or sloped surface 46, which directs it to be reflected against the lower angled or sloped surface 48. Where the upper and lower angled surfaces meet at an 90° angle, the light beam 333 will be reflected at 90.degree. angles from these surfaces.

When the light beam 333 is reflected against the conical structure and then the upper angled surface 46, it undergoes another total terminal reflection and is reflected in a from a vector originally travelling north to a vector travelling south. Next, the light beam (from second path 104) will strike lower angled surface 48 in FIGS. 3, 6, 7 and 8. The reflection from the TIR will send the light beam 333 to the right (or east). This light beam 333 will spread out in 180 degrees horizontal direction. The light beam 333 will head towards to be output via cylindrical sidewall surface 96.

A diffuser 98 can be applied to this cylindrical surface 96 to cause the light beam 333 on second path 104 to spread in a vertical direction. The amount or degree of spread can be customized with either a standard light shaping diffuser or a flat top diffuser or the like. The diffuser 98 has a very low angle (such as less than 20 degrees, less than 10 degrees, less than 5 degrees, or 1 degree or less) in the horizontal direction and a custom angle in the vertical direction. The diffuse light 335 exiting the cylindrical member 20 is now travelling The light beams 333 exit the output cylindrical surface 96, whether the light beams 333 travel first path 102 or second path 104. For light beams 333 travelling both paths, the characteristic directional spread of the output light diffusion will be identical. The only difference is the exit location of the path on the cylindrical member 20. Light beams 333 travelling on first path 102 will exit the top portion 24 of the cylindrical member 20. Light beams 333 travelling on second path 104 will exit the bottom portion 25 of the cylindrical member 20. Although Paths 1 and Paths 2 are described as singular pathways, FIG. 9 reveals that each path covers a range of exit locations, rather than a single discrete pathway. However, the output area on the cylindrical member 20 defined by first path 102 is discrete, separate, and non-overlapping with the output area on the cylindrical member 20 defined by second path 104.

In some embodiments, the inverted angled depression surface 29 is divided into a first half section distal from the semicircular member 20 and a second half section proximate to the semicircular body member 20. The second half of the inverted angled depression surface 29 preferably faces the semicircular body member 40.

When the light beam 333 strikes the first half section of the inverted angled depression surface 29 distal from the semicircular body member 20, the light beam 333 is reflected to exit the cylindrical body member 20 on a first path through the top portion 21 of the cylinder 20; and when the light beam 333 strikes the second half section of inverted angled depression surface 29, the light beam 333 reflects against the semicircular upper segment 70, then the semicircular lower segment 72, and then exits the cylindrical body member 20 on a second path through the bottom portion 25 of the cylinder 20, the first and second paths being perpendicular to the longitudinal axis of the cylindrical member 20.

Figure 6:
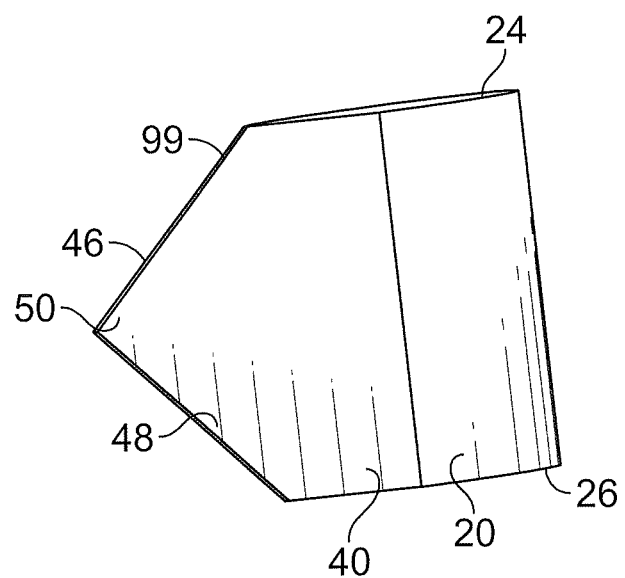
FIG. 6 shows a side view of an illumination system, with portions of the cylindrical member and semicircular member visible.
Figure 7:
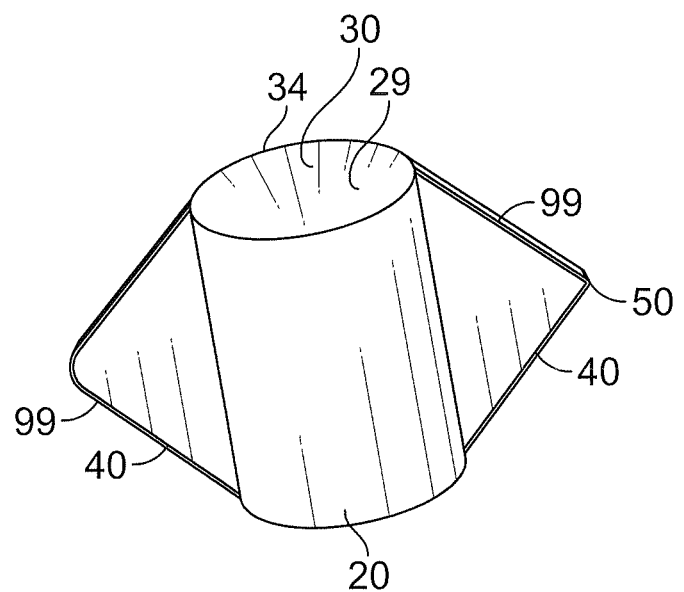
FIG. 7 shows a front perspective view of an illumination system, with the semicircular member behind the cylindrical member.
Figure 8:
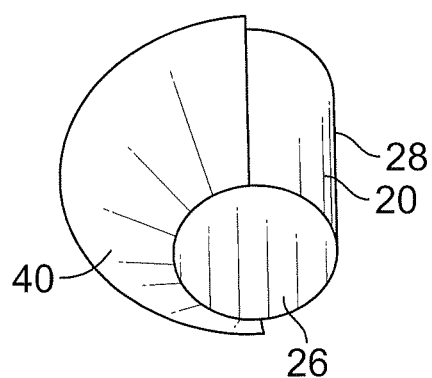
FIG. 8 shows a bottom perspective view of an illumination system, with semicircular member engaging the cylindrical member.

Utilizing this illuminator 10, since the majority of light undergoes TIR, the only losses of light (other than material transmission) are believed to occur during the entry and exit of the light beam 333 if the illuminator 10 has no coating. This is a highly efficient system since most optical systems just cut off the light which does not go in the direction desired with an aperture stop. In some embodiments, the exterior surfaces of the cylindrical member 20, conical depression 29 or the semicircular member 40, or other exterior surfaces of the illuminator 10, can include a film or coating 99, such as shown in FIGS. 6-7. Such coating 99 can provide enhancements, such as improved reflection or decreased scatter in the travelling light beam 333.

The subject invention allows for a very efficient and uniform spreading of light in a 180 degree spread. The only losses will be from the Fresnel surface reflection losses and material transmission. The entrance and exit losses can be further minimized by a thin film coating if desired. The illuminator 10 could optionally be coated with anti-reflection coating; hardness coating; bandpass filters, wavelength filters, scratch-resistant coatings, oxides, and the like.

A uniform distribution for very high angles 100 to 180 degrees, is very difficult (or impossible) to achieve without significant light loss, using flat optics, since the severe angles start to violate TIR effects in refractive optics to escape the surface.

The illumination system 10 can be molded or made in size, as long as it captures the incoming collimated light, since the TIR angles of the surfaces are essential features of this invention. Incoming light beams 333 that are rotationally symmetric will generate output light transmissions 335 that having uniform brightness and distribution.

The output cylindrical macro surface 96 can have a diffuser 98 attached which spreads the light in the vertical direction. Diffusers can be supplied as strips, sheets, films, or the like, to convert a beam of light from a focused or collimated beam into a preferred shape. For example, diffusers can convert a collimated beam into a light transmission having a predetermined shape, such as circular, elliptical, or extreme elliptical which can resemble a flattened or elongated bar). Diffusers can cause a beam of light to spread in a vertical or horizontal direction; for example, providing a light transmission spreading in a horizontal direction for a wide angle of distribution, such as 180 degrees, or for narrower angles, such less than 35 degrees. Ideally, an efficient diffuser transmits most or all of the light passing through it.

The diffuser 98 can be a classical holographic diffuser, such as a light shaping diffuser of angle "A"×1 degree, where "A", is an angle in the vertical direction, selected by the customer. As shown in FIGS. 11-19, the diffuser 98 can be a "A"×1 degrees elliptical diffuser so that the angle "A" is in the vertical direction and the 1 degree is in the horizontal or direction of the 180 degree spread. For example, the diffuser 98 can have an angle in the range of 0-90, 0-60, 0-45, 0-35, or 0-30 degrees. The diffuser 98 can be applied as a vertical strip or elongated surface, with the longitudinal axis in the vertical direction or parallel to a longitudinal axis of the cylindrical member 20 in order to spread the light in a vertical direction, the diffused light transmission 335 having at an angle of 0.5, 1, 2, 3.5, 5, 10, 15, 20, 25, 30, or 35 degrees in the vertical direction relative to the cylindrical surface in order to spread the light beam uniformly in the vertical direction (preferably while the light transmission 335 has a 180 degree spread in the horizontal direction).

Optionally, the diffuser 98 can be a flat top diffuser distribution, where the vertical direction is also uniform. This allows the flexibility in the design to customize the output distribution. The final output will be "A"×180 degrees. The diffuser 98 can be a flat-top diffuser providing a vertical angle in the range of 0-90, 0-60, 0-45, 0-35, or 0-30 degrees to the diffused light transmission 335. Such a flat-top diffuser 98 can provide an angle of 0.5, 1, 2, 3.5, 5, 10, 15, 20, 25, 30, or 35 degrees in the vertical direction to the cylindrical surface (or relative to the longitudinal axis of the cylindrical member 20) for transmitting the light beam in the vertical direction.

The material of the cylinders and cones (e.g., cylindrical and semicircular members 20, 40) of the subject invention is a polymer which will propagate light in the media, such as acrylic, polycarbonate, zeonex or any other material which is transparent to the wavelength of interest. The material can include transparent plastic materials of construction: acrylic, PC, poly-olefin, POC, PE, PET, polyurethane, and mixtures and blends thereof; could also be glass materials, inorganic glasses, transparent ceramics, and mixtures thereof. The main purpose is choice of material is to make the form functional and inexpensive. The material must have an optical index of refraction high enough for Total Internal Reflection (TIR) to operate at 45 degrees angle of incidence, therefore, using Snell's Law, the index of refraction must be greater than square root of 2 (1.4142).

The wavelengths of interest include, but are not limited to, ultraviolet, visible, near infrared, and infrared lights and includes electromagnetic energy.

Light sources providing the light beams 333 include light-emitting diodes (LED), lasers, laser diodes, gas lasers, SLEDs, vertical-cavity surface-emitting lasers (VECSEL), CSELs, organic light-emitting diodes (OLED), QLEDs, fire, lamps, incandescent lamp, mercury lamp, metal halide lamp, or any other light source that could be collimated. Light source could also be collimated using a fiber/lens assembly.

It is preferred that the cylindrical and semicircular members 20, 40 be made of the same material. The cylindrical and semicircular members 20, 40 can be manufactured as separate components or comprise a unitary structure.

The illumination system 10 can be of any size, provided it is large enough to capture the incoming light beams 333. Overall, the size of the illumination system 10 could be scaled geometrically. The illumination system 10 could be size approximately 1 cubic millimeter through 1 cubic meter, but is preferably configured to accept a collimated source beam 333 of approximately 1 mm to 1 cm in diameter or width.

The illumination system 10 can be coupled to other components to provide a variety of functions. For example, the illumination system 10 can be configured to rotate, with or without the light source rotating, to create a scanning device. Some embodiments. A illumination device could incorporate an illumination system for proving light transmissions 335 having an angle of 360 degrees, eliminating the need for scanning.

Specific embodiments of a illumination system 10 according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

I claim:

1. An illumination system comprising:
   (a) a cylindrical member comprising a top end, a middle, a bottom end, an inner surface, and an outer surface wherein the top end of the cylindrical member comprises a cone-shaped depression with a tip of the cone extending into an interior portion of the cylindrical member;
   (b) a diffuser comprising a surface relief pattern on the cylindrical member or comprising a separate diffuser attachment that is adhered to the outer surface of the cylindrical member; and
   (c) a semicircular member comprising an inner surface and an outer surface wherein the inner surface of the semicircular member encircles a portion of the outer surface of the cylindrical member and wherein the outer surface of the semicircular member comprises an upper angular surface and a lower angular surface that meet at an equatorial ridge.

2. The illumination system of claim 1 wherein the cylindrical member comprises a round or oval outline in a cross-section formed by a plane perpendicular to a longitudinal axis of the cylindrical member.

3. The illumination system of claim 1 wherein the bottom end of the cylindrical member comprises a Fresnel lens or a classical lens to collimate a light beam entering the cylinder.

4. The illumination system of claim 1 wherein the cylindrical member and the semicircular member comprise a material comprising a polymer, a glass, a ceramic, or a mixture thereof.

5. The illumination system of claim 1 wherein the cylindrical member and the semicircular member comprise a polymer comprising acrylic, polycarbonate, cyclic olefin copolymer, polyethylene, polyethylene terephthalate, polyurethane, or a mixture thereof.

6. The illumination system of claim 1 wherein the cylindrical member and the semicircular member comprise a material having an index of refraction greater than about 1.41.

7. The illumination system of claim 1 wherein the cylindrical member and the semicircular member comprise separate components or comprise a unitary structure.

8. The illumination system of claim 1 wherein the diffuser comprises a holographic diffuser or a flat top diffuser.

9. The illumination system of claim 1 wherein the diffuser comprises a holographic diffuser comprising an elliptical diffuser.

10. The illumination system of claim 1 wherein the cone-shaped depression comprises a right circular cone.

11. The illumination system of claim 1 wherein the cone-shaped depression comprises a sloped surface sloping between 10-80° from the top end of the cylindrical member.

12. The illumination system of claim 1 wherein the outer surface of the semicircular member comprises an upper angular surface comprising a sloped surface sloping between 45-135° from the top end of the cylindrical member and a lower angular surface comprising a sloped surface sloping between 45-135° from the bottom end of the cylindrical member wherein the upper angular surface and the lower angular surface meet at an equatorial ridge forming an angle between 60-120°.

13. The illumination system of claim 1 wherein the outer surface of the semicircular member comprises an upper angular surface and a lower angular surface wherein the angled surfaces comprise flat surfaces, curved surfaces, or irregular surfaces.

14. The illumination system of claim 1 wherein the cylindrical member and the semicircular member comprise heights that are similar.

15. The illumination system of claim 1 wherein the semicircular member encircles about half of the cylindrical member.

16. The illumination system of claim 1 wherein the cylindrical member and the semicircular member comprise a hollow interior or a solid interior.

17. The illumination system of claim 1 wherein the diffuser provides a vertical angle in the range of 0-35° to light exiting the illumination system.

18. The illumination system of claim 1 further comprising a film or coating.

19. The illumination system of claim 1 further comprising a film or coating comprising an anti-reflection coating, a hardness coating, a bandpass filter, a wavelength filter, a scratch-resistant coating, an oxide, or a mixture thereof.

20. The illumination system of claim 1 configured to rotate with or without a rotating light source to create a scanning device.

* * * * *